Jan. 7, 1964     C. E. CLELAND ETAL     3,117,036
COLD WORKING PROCESS FOR STRESS RELIEVING METAL STOCK
Filed Dec. 3, 1959     4 Sheets-Sheet 1
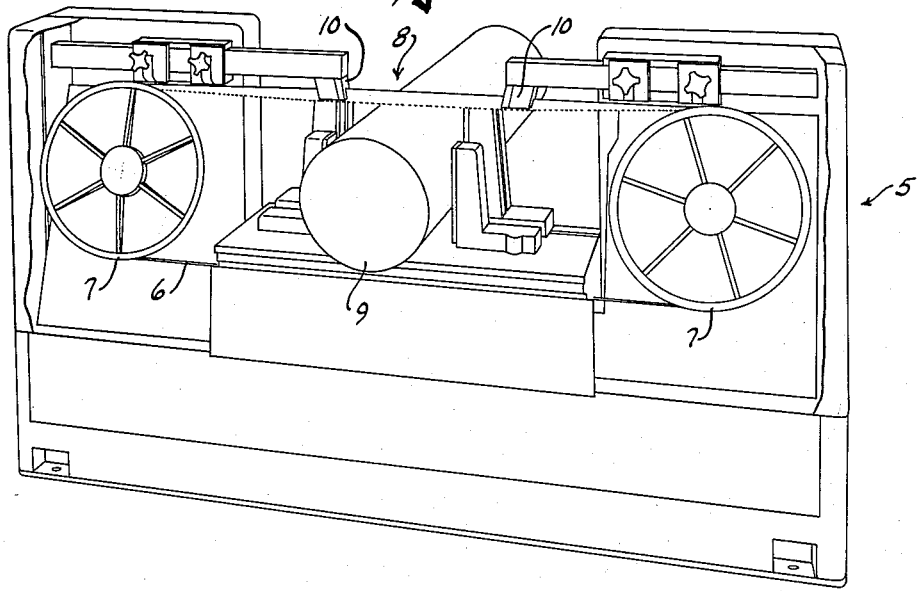
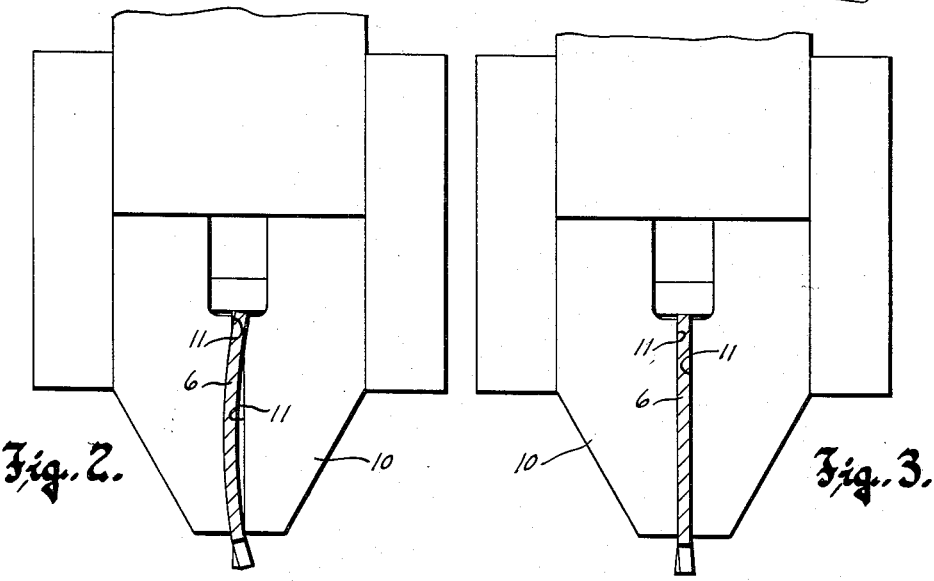
OLD             NEW
Inventors
Charles E. Cleland
Robert L. Crane

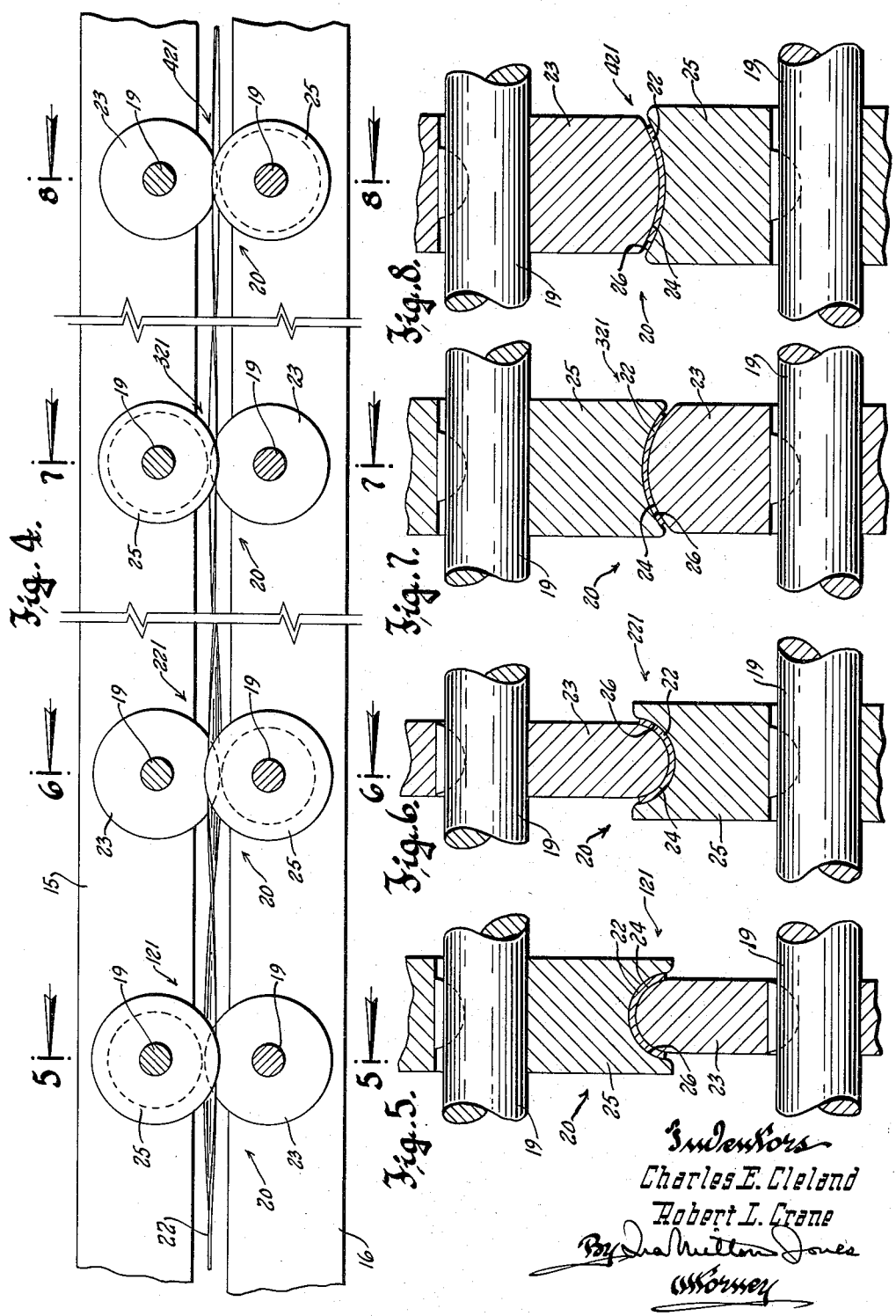

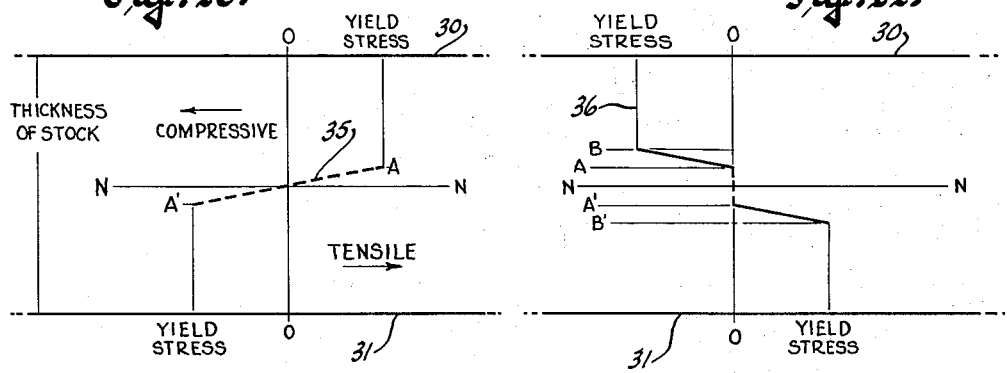
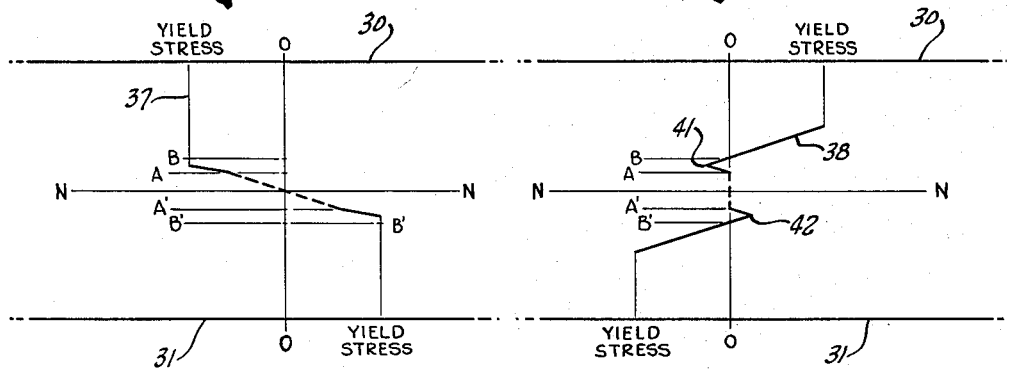
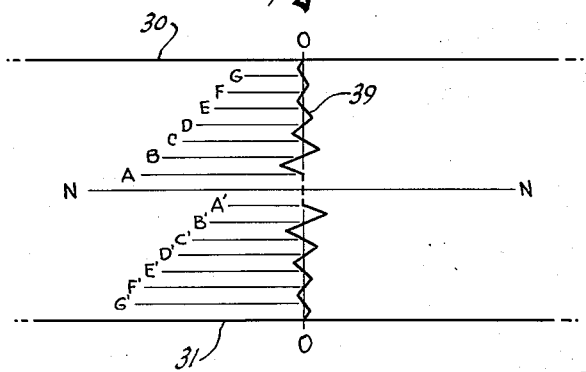

United States Patent Office 3,117,036
Patented Jan. 7, 1964

3,117,036
COLD WORKING PROCESS FOR STRESS
RELIEVING METAL STOCK
Charles E. Cleland, Minneapolis, and Robert L. Crane,
Hopkins, Minn., assignors to Continental Machines,
Inc., Savage, Minn., a corporation of Minnesota
Filed Dec. 3, 1959, Ser. No. 857,208
6 Claims. (Cl. 148—4)

This invention relates to the cold working of metal pieces to remove therefrom residual stresses which tend to deform the metal out of a desired curvature along one dimension, and the invention relates more specifically to a method or process, and to apparatus for performing the same, which has as an important specific object the flattening of metal band stock to remove dish or crown therefroms.

In many applications of metal band material it is important that the stock be perfectly flat in the transverse dimension across its opposite faces, and that it have no high residual stresses. As a specific example, metal band stock intended to be formed into band saw blades must meet these requirements in order to permit a saw band to be produced from such stock that will make a straight and true cut.

The departure of band material from perfect flatness in the dimension transversely across its surfaces is known as "dish" or "crown." If a saw band is visualized in cross section as it cuts through a piece of work, the objectionable nature of dish or crown can be readily understood, since a dished band will have a substantially arcuate cross section that causes the teeth to point or aim at an oblique angle to the intended plane of the cut. Although the saw guides of a band saw machine tend to deform a dished band to flatness as it passes between them, the saw band springs back to its dished condition as it traverses the cutting zone between the saw guides, and therefore the teeth are aimed into the work in a direction that does not correspond to the orientation of the guiding surfaces of the saw guides, causing the saw to try to cut away from the direction in which it is aimed by the guides. Obviously it becomes very difficult to make a straight and true cut with a dished or crowned saw band.

It will be apparent that dish or crown becomes increasingly objectionable with wider saw bands. The "pointing error" of the toothed edge is a function of its angular deviation from alignment with the saw guide faces, and therefore the wider the band the greater the angular deviation caused by any given radius of dishing curvature.

Heretofore manufacturers of saw bands have approached the problem of dish by specifying in their orders for band stock that such stock could not have more than a certain maximum defined dish, but the mills and suppliers added a premium to the price of the stock for compliance with such specifications and even then seem to have had difficulties in meeting the saw band manufacturers' requirements for perfectly flat stock.

In recent years some manufacturers of saw bands have found it advantageous to use hardened and tempered band stock in order to obtain saw bands having a long useful life, but they have found that their difficulties in obtaining stock which meets their flatness requirements are even greater with tempered stock than with untempered stock.

An example of the troubles actually encountered with crown or dish is illuminating. One manufacturer of saw bands specified that the extreme limits of dish in a finished saw band, for tolerably satisfactory cutting, are ±.0015 in. per inch of band width. On an order for 4,000 feet of 2" x .050" band stock placed by this manufacturer, on which a premium was charged for a guarantee that the stock would have such flatness as would presumably keep the finished saw band within tolerable limits of dish, 53% of the stock received was out of tolerance because of excessive dish, and most of the stock that was within tolerance limits was of such short lengths that 98.6% of the material could not be used for what would have been considered satisfactory saw bands.

Even when band stock was received that conformed to the required flatness specifications, it often happened that the relief of some of the residual stresses in such stock as a result of the formation of teeth in the band left unbalanced stresses in the stock that caused undesirable dishing. High residual stresses might also be troublesome when the saw band was put to use, even though the band was prefectly flat, because the working loads imposed upon a saw band are very high. When the stresses created by such loads were added to high residual stresses in the band, the sum of such stresses sometimes exceed the yield strength of the material, causing the band to change shape in one dimension or another during use.

With the foregoing in mind, it is the principal object of this invention to provide a method and means for flattening metal stock, such as band stock, along one dimention thereof, and for relieving residual stresses in such stock along the same dimension.

It is also a more general major object of this invention to provide a method of cold working metal pieces to relieve residual stresses in the metal and at the same time, form the piece to a desired curvature along one of its dimensions, it being understood that true flatness is one type of such desired curvature.

Another object of this invention resides in the provision of a method of cold working metal stock to relieve residual stresses therein, whereby the maximum residual stresses left in the metal at the conclusion of the stress relieving operations of this invention may be precisely predetermined and controlled.

It will be observed that the stress relieving method contemplated by this invention is a cold working process and is thus immediately distinguishable from the well known heat treatment for stress relieving, wherein the application of heat to the metal relieves high residual stresses in the metal by reason of the fact that metals have a lower yield point when they are heated. If metal stock is heated, for example, to a temperature which would cause the material to yield at a stress of 40,000 p.s.i., all residual stresses in excess of 40,000 p.s.i. would be removed from the metal because it would yield in response to such stresses, but residual stresses below that value would still be present in the material. An important disadvantage of stress relieving by heat treatment is that when the stock yields to the higher stresses during the heat relieving operation it necessarily assumes a new shape, and in many cases it is deformed by the heat treatment to such an extent that it becomes unusable. Heat relieving has the further important disadvantage that the application to hardened and tempered metal of sufficient heat to materially lower the residual stresses in it also has the effect of softening the metal, substantially cancelling the desirable effects obtained by hardening and tempering.

By contrast, the present invention has for another of its objects the provision of a bending method of removing residual stresses from metal stock whereby the magnitude of the residual stresses after the method has been practiced thereon may be closely predetermined and controlled, whereby the original nominal shape of the stock is restored at the conclusion of the process, but with irregularities in such shape eliminated as a result of elimination of residual stresses from the material, and whereby the temper or hardness of the metal is not adversely affected.

In this connection it is also an object of this invention to provide a cold working process for stress relieving metal stock which takes advantage of the fact that when metal is bendingly deformed the stresses in it cannot exceed an ascertainable maximum which is the yield level of the material, and that while it is held so deformed stresses below the yield level in any part of the metal will be changed from the value they had before deformation in direct linear relation to the magnitude of deformation of that part of the metal.

Another object of this invention resides in providing a method of relieving residual stresses in band stock and the like, and at the same time eliminating dish or crown from the stock, which method may be practiced by means of relatively simple and inexpensive apparatus and requires no heating equipment for its practice.

With the above and other objects in view which will appear as the description proceeds, this invention resides in the novel method and apparatus substantially as hereinafter descirbed and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

FIGURE 1 is a fragmentary perspective view of a band sawing machine, specifically a cut-off saw, which emplays a saw band manufactured from metal band stock, illustrating an important use for metal stock treated in accordance with the method of this invention;

FIGURE 2 is a more or less diagrammatic view of a dished saw band (shown in cross section) moving through the cutting zone of a band sawing machine, one of the saw guides through which the band passes as it enters and leaves the cutting zone being shown in elevation, and the figure illustrates how dish in a saw band can affect its cutting accuracy;

FIGURE 3 is a view similar to FIGURE 2 but illustrating traverse of the cutting zone by a flat saw band, such as has been straightened by the method of this invention;

FIGURE 4 is a fragmentary side elevational view of a machine by which band stock may be flattened in accordance with the method of this invention to remove crown or dish therefrom and relieve the band stock of high residual stresses;

Figure 9:
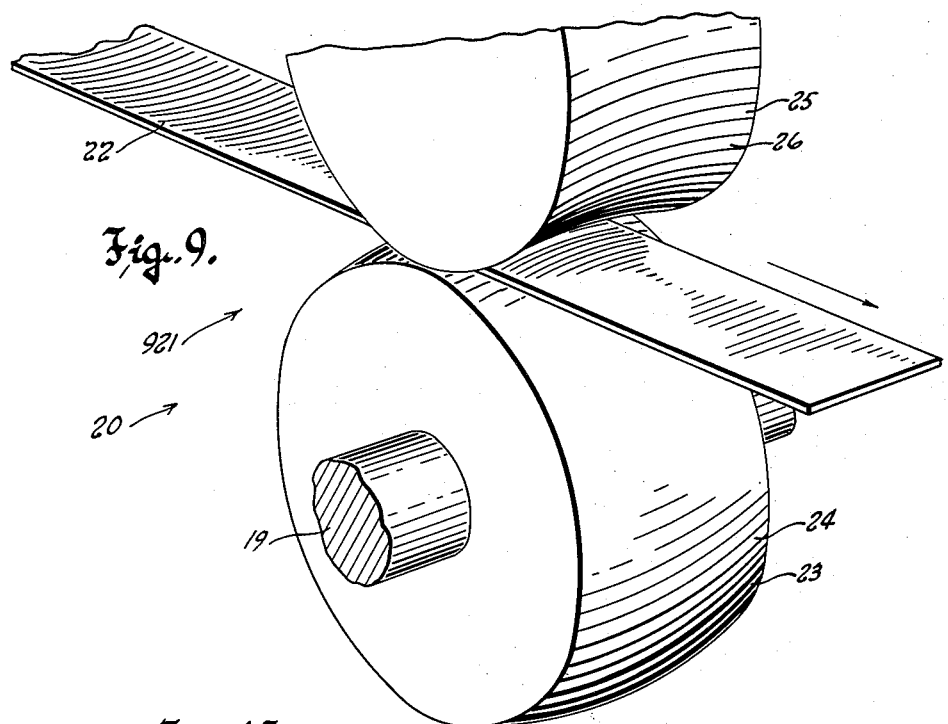
Figure 15:
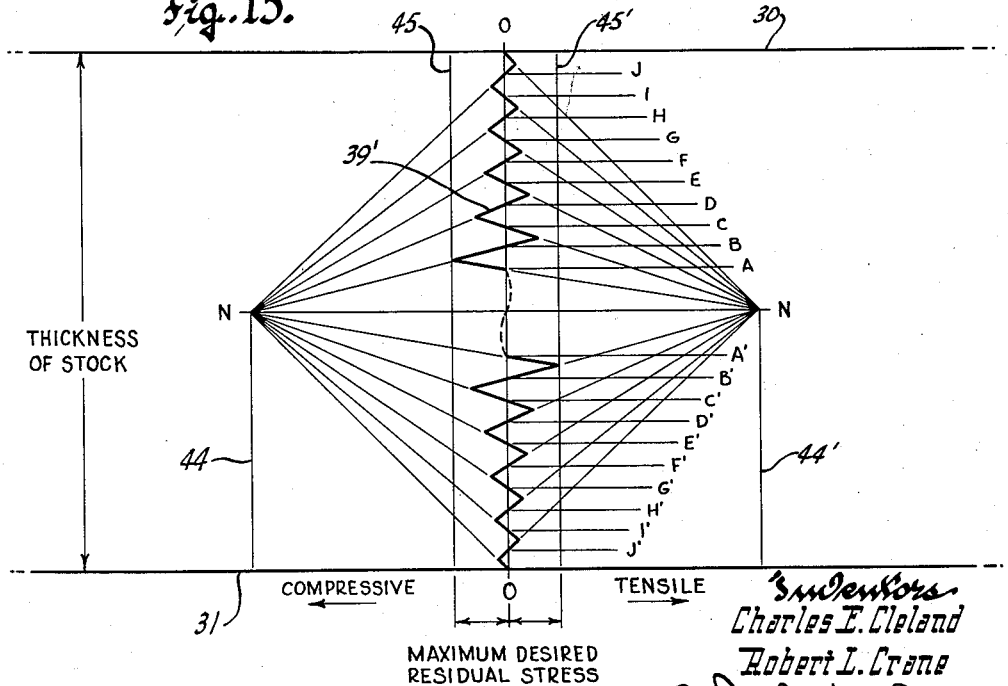

FIGURES 5, 6, 7 and 8 are sectional views, respectively taken on the planes of the lines 5—5, 6—6, 7—7 and 8—8 in FIGURE 4;

FIGURE 9 is a fragmentary perspective view of a pair of rollers by which the final step in the process of this invention may be performed, showing a portion of a length of stock being bent by said rollers, and another portion of said stock, which is in advance of that gripped by the rollers, springing to the flat condition which it automatically assumes at the conclusion of the process;

FIGURE 10 is a graph of the stresses present in band stock while it is being subjected to the first bending step in the method of this invention;

FIGURE 11 graphically depicts the stresses that would be present in band stock if it were held flat after being subjected to the first bending step in the method of this invention;

FIGURE 12 is a graph of the stresses in band stock while it is being bent in accordance with the second step of the method;

FIGURE 13 is a graph of the stresses that would be present in the stock if it were held flat after the second step of the method had been performed upon it;

FIGURE 14 is a graph depicting the residual stresses present in band stock at the conclusion of the method or process of this invention; and FIGURE 15 is an illustration of how the maximum residual stresses to be left in a piece of band stock treated by the method of this invention may be graphically predetermined.

Referring now more particularly to the accompanying drawings, the numeral 5 (see FIGURE 1) designates generally a band sawing machine of known type, the cutting element of which comprises an endless metal saw band 6 trained around a pair of relatively large diameter pulleys or band wheels 7, one of which is power driven to impart orbital motion to the band. The saw band is formed from a strip of band stock, having teeth fashioned on one edge thereof by a known process, and it has its opposite ends welded together to hold it in an endless loop. In one portion of its orbit, between the band wheels, the band 6 passes through a cutting zone 8 at which a work piece 9 may be held for engagement by the band and which is defined by a pair of saw guides 10, spaced apart lengthwise of the band. In the case of the illustrated cut-off saw, the saw guides perform the function of imparting a twist to the saw band so that the stretch thereof in the cutting zone has its side faces vertical despite the fact that the axes of the band wheels are almost horizontal. In all cases the saw guides have opposing surfaces 11 which define, in effect, closely fitting slots through which the band passes as it enters and leaves the cutting zone, which surfaces serve to steady and guide the band as it traverses the cutting zone.

To a greater or lesser extent, depending upon the amount of dish in the saw band, the saw guides point or aim the saw band in a given cutting direction. As illustrated in FIGURE 2, if the band has any dish or curvature across its width, the teeth will inevitably point to one side of their intended path as the band moves through the cutting zone, out of the influence of the guides, so that the saw band tends to produce a cut surface which is not straight but which, instead, is dished or "cut out" in the direction of aiming error, and since the direction and extent of the dish present in bands which are not truly flat varies widely, the error or deviation of the formed cut from its intended plane is entirely unpredictable. However, if the saw band is truly flat across its width, as illustrated in FIGURE 3, it will, of course, cut in exactly the direction in which its teeth are pointed by the sliding engagement of its flat side faces with the guide surfaces 11 of the cutting guides, and the band will produce a satisfactory straight cut.

The process of this invention is herein described with particular reference to removing dish and substantially relieving high residual stresses from metal band stock intended to be made into saw bands, but it is to be understood that this is merely illustrative of one particularly useful application of the invention. In fact, the process may also be advantageously applied to metal stock of other shapes to straighten and stress relieve the metal along one dimension of the stock, which need not necessarily be the width of the piece, and the process is also applicable to stress relieving metal pieces having some desired curvature other than flatness or zero curvature along one dimension of the stock so as to remove high residual stresses.

In essence, the method of this invention, as applied to the removal of dish from band stock, is carried out as follows. First the metal is bent all across its width to a very severe curvature, thus imparting to the stock a markedly arcuate cross section. Preferably the stock is bent nearly or completely to a semicircular cross section. Next the stock is rebent, all across its width, to an approximately equal curvature in the opposite direction. Then the stock is bent back to a curvature in the first direction, which curvature, however, is less than that first imparted to the stock. The stock is then again bent in said opposite direction, this time to a curvature less than that imparted to the stock by the immediately preceding bending operation. Such bending, first in one direction and then in the other, is repeated a number of times, and in each bending step the stock is bent to a lesser curvature than it was given by the previous bending step, but in the opposite direction. If the radius of curvature to which the stock was bent in each of the several bending steps was correctly chosen, as hereinafter explained, the stock will automatically assume true flatness when it is freed from the last such bending step.

The number of bending steps to which the stock must be subjected depends primarily upon the maximum residual stresses which can be tolerated in the stock after it has been subjected to the stress relieving and flattening process of this invention. As an example, it has been found that eleven such bending and rebending operations are satisfactory for .050" x 2" saw band stock.

The apparatus depicted in FIGURES 4–9 inclusive, is illustrative of one means for practicing the method of the invention. It consists of a pair of rigid, elongated frame members 15 and 16, preferably extending horizontally and disposed in spaced apart superimposed relation. Fixed to and rotatably supported by the frame members are a plurality of forming rollers 20 journaled on shafts 19. The forming rollers are disposed in opposite pairs 121, 221, 321, 421, etc., and the several pairs of forming rollers cooperate to define a path along which band stock 22 can move endwise between the rollers, to be worked upon by them. It will be understood that the machine also includes known means (not shown) for introducing band material into the roller pairs, guidingly moving it between them, and leading it out of the machine; and synchronized power means to drive the rollers.

Each pair of forming rollers comprises a roller 23 which has its peripheral surface 24 curved convexly in the direction transverse to the roller, that is, in cross section, and a cooperating roller 25, the peripheral surface 26 of which has a corresponding concave transverse curvature. The configuration and relationship of the rollers of each pair may be readily understood from FIGURES 5–9, inclusive. The rollers are mounted with their axes parallel and with their peripheral surfaces radially opposite one another and spaced apart a distance equal to the thickness of the metal to be worked, it being understood that suitable means (not shown) are provided to raise and lower one of the frame members or otherwise adjust or set the spacing between the "top and bottom" rollers.

As the band stock moves through the machine, it first passes through a roller pair 121 (see FIGURE 5), the rollers of which have convex and concave peripheral surfaces that are transversely curved on a relatively small radius and which cooperate in imparting a substantially severe curvature to the band, all across its width. Preferably the first roller pair bends the band to a substantially semicircular cross section. The second roller pair 221 (see FIGURE 6) has rollers which are substantially identical with those of the first pair 121, but the convex and concave rollers are at opposite sides of the path of the band from the corresponding rollers of the first pair. In other words, if the convex roller of the first roller pair is below the band and engages its under surface, as shown, then the convex roller of the second pair is above the band. As the band stock passes through the two pairs of rollers 121 and 221 it is first bent to a severely arcuate cross section in one direction and then re-bent to an approximately equally curved arcuate cross section in the opposite direction.

The third roller pair 321 along the path of the band stock comprises complementary convex and concave rollers disposed on the same sides of the band as the corresponding rollers of the first pair, but, as may be seen from FIGURE 7, the peripheral surfaces of the rollers of the third pair are transversely curved to a larger radius than the rollers of the first and second pairs so that the rollers of the third pair impart a lesser degree of curvature to the band stock as it moves through them, although they curve it in the same direction as the first pair of rollers. The rollers of the fourth pair 421 (see FIGURE 8) are again disposed with the convex roller above the band and the concave roller below it, so that they curve it in the opposite direction to the third pair, but the peripheral surfaces of the rollers of the fourth pair are transversely curved to a wider radius than the rollers of the third pair so as to impart to the band stock a still lesser degree of curvature.

It will be understood that the fifth and subsequent pairs of bending rollers correspond in all respects to those already described, except that the rollers of each succeeding pair along the direction of travel of the band have their peripheral surfaces transversely curved on a larger radius than that of the rollers of the preceding pair along the path of motion of the band. Thus the several pairs of rollers along the path of the stock cause the band to be alternately curved first in one direction and then in the other all during its progress through the machine, bending the stock on a larger radius at each bending step after the second. Each pair of rollers has its peripheral surfaces curved transversely along a circular arc, so that when in the grip of a pair of rollers the band is held curved to a uniform radius across its width.

The band stock finally passes through a pair of rollers 921 (see FIGURE 9) which bend it to an arcuate cross section that is only very slightly curved; and after it passes out of the grip of these rollers it automatically springs to perfect flatness across its width.

The band stock tends to assume flatness after the final bending step because, as will be understood from the explanation that follows, the several bending steps to which it has been subjected have produced in the band a pattern of very low residual stresses, and these residual stresses are of such value, and are so distributed, that the net sum of their moments about the neutral axis is zero when the band is flat; hence the band will be flat when free of external forces.

The stresses in the band stock while it is held between the first pair of rollers, bent to a severe dish, are shown in FIGURE 10, wherein the vertical line 0—0 is the line of zero stress and the neutral axis, designated by N—N, lies midway between the top and bottom surfaces 30 and 31 of the stock. The stresses caused by forming the band to an arcuate cross section are represented by the curve 35 in FIGURE 10, wherein stresses plotted to the right of the zero stress line 0—0 are tensile stresses while those to the left of it are compressive stresses. The stresses are, of course, zero along the neutral axis, increasing both above and below it in proportion to the distance from the neutral axis, until at points A and A', spaced substantially equal distances above and below the neutral axis, a stress level equal to the yield strength of the material is reached. Since the material cannot carry a stress in excess of its yield strength, it yields from the point A upwardly to the upper surface 30 and from the point A' downwardly to the lower surface 31, and the resultant stresses all through these portions of the band will be equal to the yield level of the material.

The portion of curve 35 depicting the values of the stresses between the points A and A' is merely an approximation because the exact value of these stresses is dependent upon the residual stresses which existed in the material before the stock was subjected to the first bending step of the method, and the value of those original stresses can never be known. It may be noted at this point that the original residual stresses in the zone A—A' remain in the metal, unchanged, at the conclusion of the process, but because of the narrowness of this zone and its proximity to the neutral axis these stresses, even though unknown, are of negligible consequence.

Since the objective of the process is to flatten the band and create in it low residual stresses, it is helpful at this point to consider the curve 36 in FIGURE 11, which depicts the stresses that would be present in the band if it were held flat after the first bending step.

With the band thus flattened, the stresses in the zone A—A′ would return to zero, assuming that the residual stresses in this zone before the first bending step had actually been zero. Through a pair of zones outwardly of the zone A—A′ the stresses would increase in magnitude substantially in proportion to the distance from the neutral axis, reaching a maximum value equal to the yield level at points B and B′ spaced outwardly to opposite sides of the zone A—A′. The amount of effective moment that must be applied to the band in order to force it flat is represented by the moments of the area bounded by the curve 36 and the zero stress line 0—0, and since those forces would have to be equal and opposite to the moments holding the band dished, the curve 36 also represents the stresses which would tend to restore the band to a condition approaching the dished formation given it by the first bending step.

Actually, of course, the band is bent past flatness in the rebending step following the first bending step, and is brought to a curvature nearly equal in radius but opposite in direction to that imparted to it by the first bending step. The stresses present in the band while it is subjected to such rebending forces are as illustrated by the curve 37 in FIGURE 12. Comparing FIGURES 11 and 12, it will be seen that as a result of the rebending step, stresses equal to the yield level of the material have been created in zones intermediate the zone A—A′ and the points B and B′, i.e., in the outer portions of zones A—B and A′—B′. Of course, the stresses in the zones outwardly of the points B and B′ will also be at the yield level value, which is the maximum value that they can attain.

If the band were flattened after the second bending step, the stresses in it while it was held flat would be as depicted by the curve 38 in FIGURE 14, and the effective moment that would have to be applied to hold it flat would be the moments of the areas between the curve 38 and the zero stress line 0—0, taken about the neutral axis. It will be observed from the curve 38 that the stresses are exactly zero at the points B and B′. This is because the band was bent to a radius, in the second step, which was so chosen that at the points B and B′ the difference in stresses between a flat band and a band curved to the chosen radius would be equal to the yield strength of the material.

After the second bending step all portions of the zones A—B and A′—B′ will have been subjected to stresses at or above the yield level, and therefore the residual stresses originally present in the stock outwardly of the zone A—A′ will thereafter have no effect on the stress curve because of the fact that the stock cannot sustain stresses above its yield level.

Within the zones A—B and A′—B′ only some of the stresses that were caused by the second bending step would be relieved by holding the stock flat after that step, and the remaining stresses would be as indicated by the peaked portions 41 and 42 on the curve 38 in FIGURE 13. These residual stresses will still be present in said zones, with their values unchanged, if the stock is pressed flat after the third or any subsequent bending steps of this process because all of such subsequent steps impart a lesser curvature to the stock than it was given by the first and second bending steps and therefore subject the metal in zones A—B and A′—B′ to lesser deforming forces than were imposed upon them by the first two bending steps. Hence the metal in those zones is never again stressed to its yield point and sustains purely elastic deformation during all bending step after the second one.

The stock is bent to a lesser curvature in the third bending step that it was given in the first two bending steps, and therefore while it is held so bent stresses below the yield level are produced in the inner portions of zones B—C and B′—C′, which lie outwardly of the zones A—B and A′—B′; and when the stock is subsequently flattened these new stresses below the yield level will be opposite in direction to the stresses in the zones A—B and A′—B′ which were created as a result of the second bending step. If the amount of curvature imparted to the stock in the third bending step is correctly selected (as hereinafter described), said new stresses in the zones B—C and B′—C′ will have a lesser magnitude than the stresses in the zones A—B and A′—B′, but being located at a greater distance from the neutral axis they will exert deforming moments upon the metal which substantially cancel those exerted by the stresses in the zones A—B and A′—B′.

Curve 39 in FIGURE 14 depicts the stresses which exist in metal stock which has been stress relieved and flattened by subjecting it to a number of bending steps performed in accordance with the principles of this invention as outlined above. It will be observed that each bending operation creates in the flattened stock stresses which are below the yield level and which lie in zones outwardly adjacent to the zones of the stresses created by the previous bending step. Moreover, since the curvature imparted to the stock in each bending step is opposite to that imparted to it in the previous step, the residual stresses created in the flattened stock by each bending step will be opposite in direction to those created by the previous bending step and will tend to neutralize or cancel the effects of the stresses caused by the previous bending step.

It will be apparent that if the sum of the moments of the areas of the curve around the zero stress line 0—0, taken about the neutral axis N—N, is zero, the force required to hold the band flat will be zero, or in other words the band will be flat when free. If the radii of curvature imparted to the band in the several bending operations have been so selected that the sum of the moments of the areas about the neutral axis is not zero, the absolute value of this sum will cause the band to have dish when free, the magnitude of the dish being proportional to the magnitude of said sum.

The radii to which the band must be bent in the several bending steps may be calculated as shown in FIGURE 15. The surfaces 30 and 31 of the metal stock are drawn to an enlarged scale, and the neutral axis N—N is drawn midway between them. Perpendicular to the neutral axis is drawn the zero stress line 0—0, and two lines 44 and 44′ are drawn equidistant from and parallel to the line 0—0. The distance from 0—0 to the lines 44 and 44′ represents, on an arbitrary scale, the yield strength of the band to be processed, in compression and in tension, respectively. The maximum level of residual compressive and tensile stresses to be tolerated in the band is represented by lines 45 and 45′, respectively, which are parallel to the zero stress line 0—0 and spaced from it by a distance which is proportional to the distance from the zero stress line to the yield level lines 44 and 44′. The spacing of lines 45 and 45′ from the line 0—0 is thus determined by the scale selected for the spacing of the yield level lines from the zero stress line.

From analysis of FIGURE 15 it can be seen that as the number of bending steps in the process is increased, the finished band has increasingly lower maximum residual stresses. Thus it is possible to produce a dish-free band with the process of this invention by subjecting the band to relatively few bending steps, but the band would then have high residual stresses. In other words, the closer the lines 45 and 45′ are placed to the zero stress axis, the more bending steps will have to be provided for.

Points A, A′, B, B′, C, C′, etc. are scaled off on the zero stress axis, the number of such points on each side of the neutral axis corresponding to the number of bending operations intended to be employed, and the locations of the points being arbitrarily selected for the purposes of initial computation. Since the yield value of the metal is the same in both tension and compression, points A and A′ are equidistant from the neutral axis, as are B and B′, C and C', etc. Through the points A, A', B, B', C, C', etc. the residual stress curve 39' is drawn, the slope of the curve at each point being determined by a straight line connecting such point on the zero stress line 0—0 with the intersection of the appropriate yield level line 44 or 44' and the neutral axis. This slope is a graphic expression of the fact that the stresses in each zone of the flattened stock increase linearly outwardly from zero at the inner boundary of the zone, at a rate of increase which is proportional to the distance from the inner boundary of the zone to the neutral axis.

If any part of the curve 39' thus plotted extends beyond the preselected maximum stress lines 45, 45', the points A, A', B, B', etc. must be reselected with lesser spacing between them (i.e., more bending steps will be necessary) until the curve stays within the desired limits.

When the curve 39' has been plotted to maintain the desired maximum stress limits, the moments of the areas of this curve about the zero stress line 0—0 are added, regarding areas to the right of the line 0—0 as positive (+) and those to the left of it as negative (−). If the sum of these moments does not equal zero, adjustments must be made to the points A, A', B, B', C, C', etc. in a manner to increase either the positive or the negative moments, whichever totals more than the other, until the curve as redrawn through the newly selected points satisfies both of the required conditions, namely that no part of the curve falls outside the lines 44 and 44' representing the desired maximum stress limits, and that the sum of the positive and negative moments is equal to zero.

When the points A, A', B, B', C, C', etc. have been established to satisfy the above conditions, the distances of these points from the neutral axis are scaled off of the plot and are used in computing the amount of curvature that must be imparted to the band in each bending operation to satisfy the plotted set of values. The radii to which the band must be bent to cause the stresses in stress free metal to just reach the yield level at these various points when the metal is bent can be determined by means of the formula:

$$S = E \cdot \frac{T}{D+T}$$

where S is the value of stress (i.e., the yield level), T is "thickness," D is the diameter of the arc to which the band is bent along its neutral axis and E is the tensile modulus of elasticity of the metal of the band. To determine the radius on which the band is to be curved in the first bending, twice the distance N—N to A (i.e., the distance from A to A') is substituted for T in the above formula and the equation is solved for D, which is of course twice the desired bending radius. The forming radius for each subsequent bending step is similarly established by substituting for T in the above equation values equal to twice the distance from N—N to B (or to B'), from N—N to C, etc., and solving each time for D, the value of which is in each instance twice the bending radius for the step under consideration. Obviously for each bending step the bending radius must be uniform across the entire width of the band if unduly complicated calculations are to be avoided.

It will be seen that the method described above may be applied to the stress relieving of metal pieces having a curvature other than zero curvature or straightness, and in which such curvature is to be maintained, by bending and rebending the metal to curvatures which depart first in one direction and then in the other from the desired curvature, each time bending the metal to a curvature which departs to a lesser extent from the desired curvature.

From the foregoing description taken together with the accompanying drawings it will be apparent that this invention provides a method and means for cold working a piece of metal stock to eliminate from it high residual stresses and give it a desired curvature along one dimension of the piece, which desired curvature may be zero curvature or true flatness. It is also apparent that the invention provides a simple apparatus by which residual stresses may be substantially reduced in band stock and dish or crown eliminated therefrom, and which leaves the band stock with no residual stresses which exceed a predetermined maximum value.

What is claimed as our invention is:

1. The method of cold working a piece of metal having a pair of opposite spaced apart surfaces and having substantially a desired curvature along one dimension of said surfaces, to substantially eliminate from the metal residual stresses that tend to deform the piece out of said desired curvature, which method comprises: bending the metal piece along said entire dimension to a severe curvature in one direction by which all of the metal between one of said surfaces and a narrow zone along the neutral axis is compressively stressed beyond its yield point and all of the metal between the other of said surfaces and said zone is tensioned beyond its yield point; bending the metal piece along said entire dimension to an opposite curvature differing from the desired curvature all along said dimension by amounts such as to create, in zones outwardly adjacent to said zone along the neutral axis, residual stresses which decrease to an ascertainable magnitude below the yield level when the piece is subsequently returned to the desired curvature; and thereafter repeatedly bending the piece, imparting to the piece with each bending a curvature along said dimension which departs from the desired curvature in the opposite direction from, and to a lesser extent than, the curvature imparted by the immediately preceding bending, to thus create with each bending residual stresses which, when the piece is restored to its desired curvature, are in zones spaced to opposite sides of the neutral axis, with the residual stresses created by each bending disposed in zones outwardly adjacent to those containing the residual stresses created by the immediately preceding bending, opposite in direction to them, and of such magnitude that the residual stresses in the metal at the conclusion of the several bendings substantially balance one another when the piece conforms to the desired curvature and therefore have no tendency to deform the piece out of the desired curvature.

2. The method of cold working a piece of metal which is nominally flat along one dimension on a pair of opposite spaced apart surfaces of the piece to substantially eliminate high residual stresses from the metal and render it flat along said dimension, which method comprises: bending the piece all along said dimension to impart a substantial curvature in one direction to the piece and to compressively stress the metal beyond its yield point between one of said surfaces and a narrow zone along the neutral axis while tensioning the metal beyond its yield point between the other of said surfaces and said zone; and thereafter bending the piece a number of times all along said dimension, each time to a curvature less than that to which it was bent in the preceding bending step, so that each bending step creates residual stresses which will go to ascertainable values below the yield level when the piece is returned to flatness and which lie in zones at opposite sides of the neutral axis and outwardly adjacent to the zones of such residual stresses created by the immediately preceding bending step, and with each bending step imparting to the piece a curvature in the opposite direction from that imparted to it by the immediately preceding bending step to create residual stresses which are opposite in direction to those created by the immediately preceding step, so that the residual stresses in the metal at the conclusion of the several bending steps and with the metal straight along said dimension substantially balance one another and therefore tend to hold the piece straight along said dimension.

3. The method of cold working a nominally flat metal band having a pair of opposite surfaces extending between the longitudinal edges of the band to remove undesired curvature from the band along the transverse dimension of said surfaces, which method comprises: bending the band all along said transverse dimension to a severely arcuate cross section; and thereafter repeatedly bending the band all along said transverse dimension to an arcuate cross section, each time curving the band in the opposite direction to that in which it was curved in the immediately preceding bending step and each time bending it to a lesser arcuate curvature than it was given by the immediately preceding bending step, until the band assumes straightness along said dimension.

4. The method of stress relieving a meal piece having a pair of opposite surfaces to remove high residual stresses from the piece and straighten it along one dimension of said surfaces, which method is characterized by the steps of: repeatedly bending the piece while cold all along said dimension to an arcuate shape, with each bending imparting a lesser curvature to the piece than the preceding one, but in the opposite direction, and with each bending curving the piece sufficiently away from the curvature it had immediately therebefore to subject portions of the piece at opposite sides of the neutral zone to stresses above the yield point while the piece is being bent.

5. The method of stress relieving a metal piece having a pair of opposite surfaces to substantially remove residual stresses from the piece and give it a desired curvature along one dimension of said surfaces, which method is characterized by the steps of repeatedly bending the piece while cold all along said dimension to curve the piece away from the desired curvature, first in one direction and then in the other, with each bending imparting to the piece a curvature which departs to a lesser extent from the desired curvature than did the curvature imparted to the piece by the immediately preceding bending, and with each bending curving the piece sufficiently away from the curvature it had immediately therebefore to subject portions of the piece at opposite sides of the neutral zone to stresses above the yield point while the piece is being bent.

6. In the art of relieving residual stresses of unknown magnitude and direction from a metal piece, to achieve a desired shape along one dimension of the piece, that method which is characterized by the initial step of severely bending the piece while cold all along said dimension thereof, by forces exerted only along said dimension to impose stresses beyond the yield level upon all portions of the metal across said dimension except that portion of the metal which is in a narrow zone closely adjacent to the neutral axis, in which zone the effect of the unknown residual stresses is negligible, such bending creating in the metal outside of said narrow zone stresses of known magnitude and direction so that repeated rebending of the metal along said dimension, through predetermined magnitudes and directions of curvature, can create in the metal outside of said zone residual stresses below the yield level having ascertainable magnitudes and directions.

References Cited in the file of this patent
UNITED STATES PATENTS

| | | |
|---|---|---|
| 236,853 | Somers | Jan. 18, 1881 |
| 2,073,174 | Potter | Mar. 9, 1937 |
| 2,190,986 | Hudson | Feb. 20, 1940 |
| 2,305,793 | Puppe | Dec. 22, 1942 |
| 2,333,282 | Wilson | Nov. 2, 1943 |
| 2,337,047 | Hunter | Dec. 21, 1943 |
| 2,338,678 | Wilson | Jan. 4, 1944 |
| 2,348,539 | Harper | May 9, 1944 |
| 2,476,254 | Winlock | July 12, 1949 |
| 2,638,143 | Maust | May 12, 1953 |
| 2,895,532 | Gettig | July 21, 1959 |
| 3,006,401 | Wognum et al. | Oct. 31, 1961 |